Nov. 26, 1963    J. J. BAHN ETAL    3,112,415
CONTROL OF WINDING TEMPERATURES OF LIQUID COOLED GENERATORS
Filed Jan. 2, 1962    3 Sheets-Sheet 1

INVENTORS:
JOHN J. BAHN,
WILLIAM L. DORMANDY,
BY W. C. Crutcher
THEIR ATTORNEY.

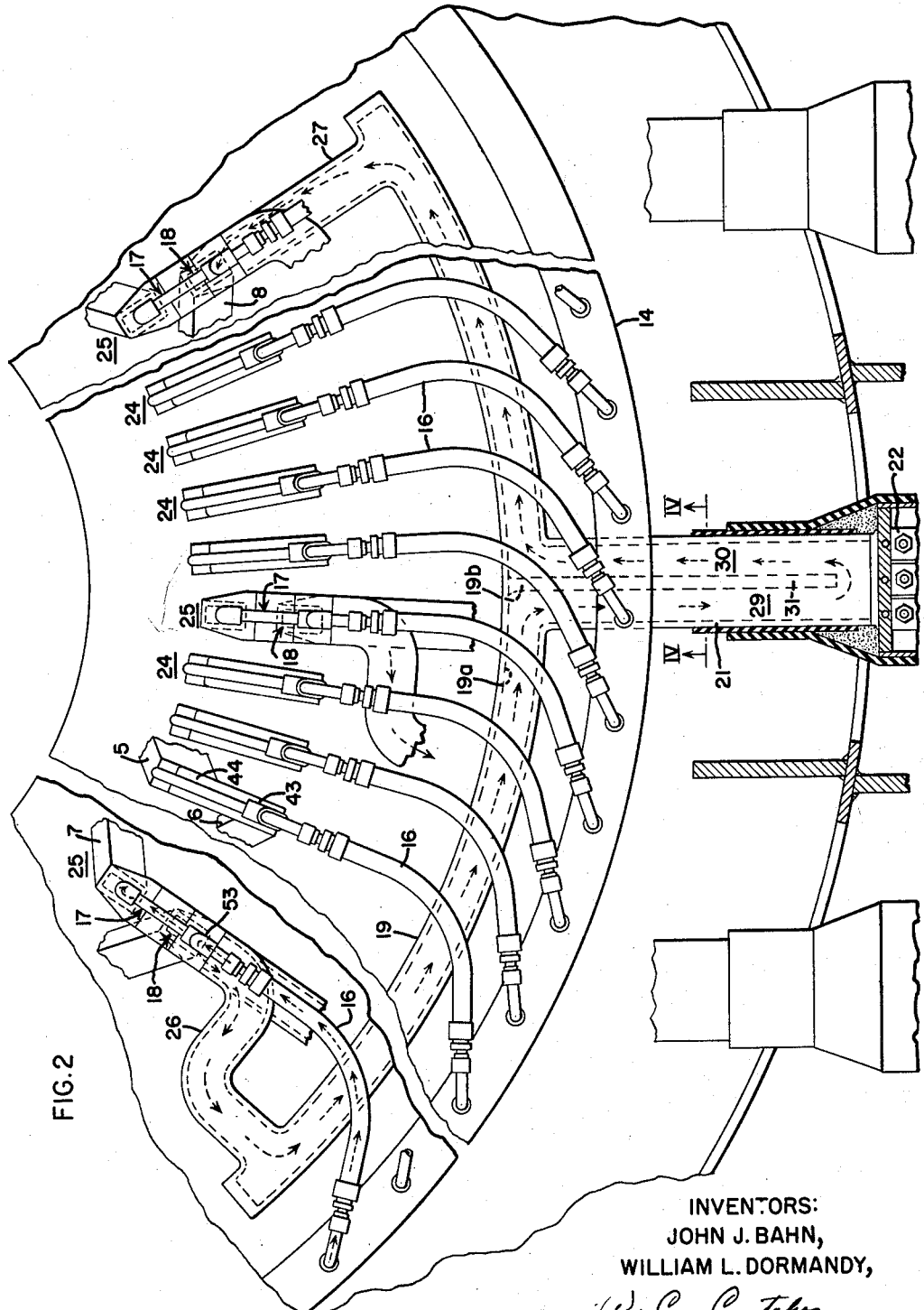

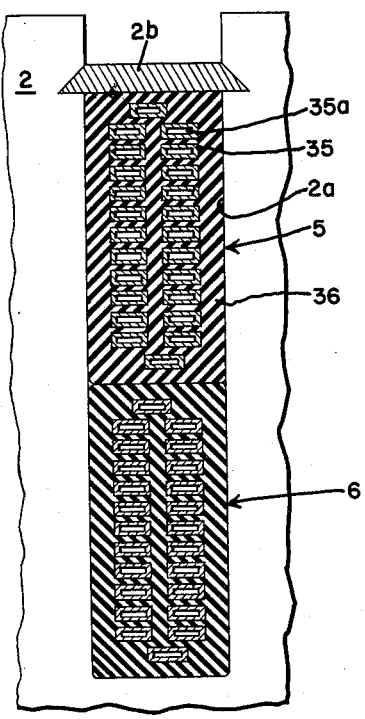
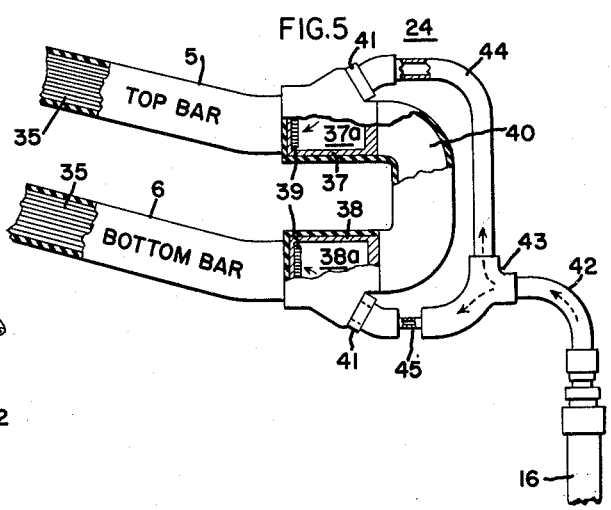
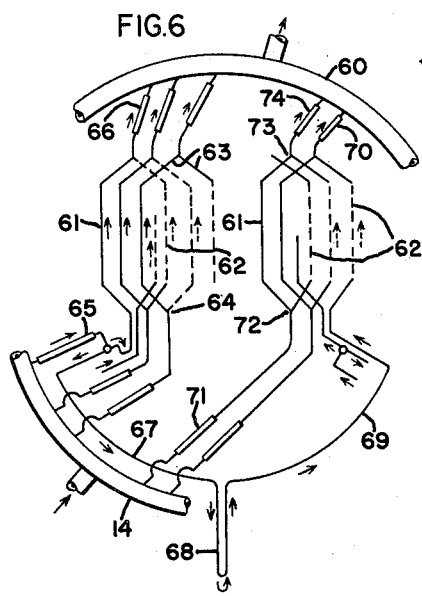

United States Patent Office 3,112,415
Patented Nov. 26, 1963

3,112,415
CONTROL OF WINDING TEMPERATURES OF
LIQUID COOLED GENERATORS
John J. Bahn, Schenectady, and William L. Dormandy,
Scotia, N.Y., assignors to General Electric Company,
a corporation of New York
Filed Jan. 2, 1962, Ser. No. 163,788
7 Claims. (Cl. 310—54)

This invention relates to an improved cooling arrangement for dynamoelectric machine stator windings wherein liquid coolant flows internally through passages inside the main insulation. More particularly, the invention relates to a cooling arrangement, which reduces temperature differences between two or more bars stacked radially in the conductor slots.

It is known that the windings of a dynamoelectric machine stator can be more effectively cooled by causing a dielectric liquid such as transil oil or deionized water to flow through the windings inside the main insulation, such as in hollow strands of a multistrand conductor bar. In a dynamoelectric machine stator winding, usually more than one of these insulated conductor bars lie in each slot formed in the laminated stator core. Very often, two such bars are employed, the "top" or radially inner bar in the slot being subjected to greater ohmic losses, and hence greater generation of heat, than the "bottom" or radially outer bar. It has also been known that the temperature difference between top and bottom bar can be reduced by the use of a "two-pass" system where the liquid flows through the length of the machine in a top bar and then returns through the machine in a bottom bar. Thus, the coolest liquid flows through the top bar with its greater heat losses and, after the temperature of the liquid has been raised somewhat, it returns through a bottom bar which has less heat losses. In this manner, the temperature difference between the top and bottom bars is reduced.

In a "two-pass" system, the liquid pressure drop in the restricted flow passages can result in large pumping losses in a large machine. Thus it has also been known to use a "single-pass" system wherein the liquid supplied at a "series loop," electrically connecting top and bottom bars at one end of the machine, flows through top and bottom bars in parallel and is collected at the "series loop" at the other end of the machine, to be recooled and recirculated. However, with this arrangement, since liquid of the same temperature is supplied to both top and bottom bars, the top bar will be at a greater average temperature than the bottom bars. Therefore, changes in load on the machine, and the start-up and shutdown cycles, can cause relative movement between the bars in a slot due to differential thermal expansion and contraction, which causes abrasion and damage to the insulation.

In large generators, the windings are such that the terminating ends or phase leads of a group of connected coils forming a phase winding are disposed at circumferentially spaced locations about the periphery at one end of the core. The connections are such that a top bar can be electrically connected with a bottom bar of the same phase, located approximately 120 electrical degrees away, by means of an arcuate conductor called a "connection ring." The connection ring is also electrically connected through "lower leads" to bushings leading through the casing. For a three-phase generator, there would ordinarily be six such connection rings, six lower leads, and six bushings disposed on one end of the generator. The connection rings and the lower leads carry substantial currents and must also be cooled. This also may be done by cooling internal passages with a gas or a liquid as has been known.

Accordingly, one object of the present invention is to provide an improved cooling arrangement which reduces the temperature difference between radially stacked bars in a liquid-cooled dynamoelectric machine.

Another object of the invention is to provide an improved cooling arrangement for a single-pass liquid-cooled generator with improved cooling for the armature bars, connection rings, and lower leads.

Still another object of the invention is to provide a "single pass" cooling arrangement having improved temperature distribution between top and bottom bars of a liquid-cooled, hollow-strand generator winding and with improved distribution of the coolant to the hollow strands.

Further objects and advantages of the invention will become apparent from the description that follows, taken in connection with the drawing in which:

FIG. 2 is a partial end view of the liquid fittings of FIG. 1, but showing only one connection ring and lower lead, the rest being omitted for clarity;

FIG. 3 is an enlarged cross-section, taken through the generator slot and armature bars along lines III—III of FIG. 1;

FIG. 5 is a horizontal elevation, partly in section, showing the liquid and electrical connections at a typical "series loop"; and FIG. 6 is a schematic view of portions of the liquid cooling circuit covering the full length of the generator with liquid supply at one end and liquid withdrawal at the other end.

Briefly stated, the invention is practiced by furnishing the radially inner bars of a "single-pass" liquid-cooled generator with liquid coolant having a greater capacity for heat removal than that furnished to the bottom bars, so that more uniform temperature is obtained between top and bottom bars. For the terminating phase lead bars, this is accomplished by first passing the liquid through the connection rings and lower leads before it enters the bottom bars, while the top bars are directly supplied with relatively low temperature coolant. At the series loops, this is accomplished by restricting the flow of liquid through the bottom bars so that more heat is removed from the top bars than from the bottom bars.

Figure 1:
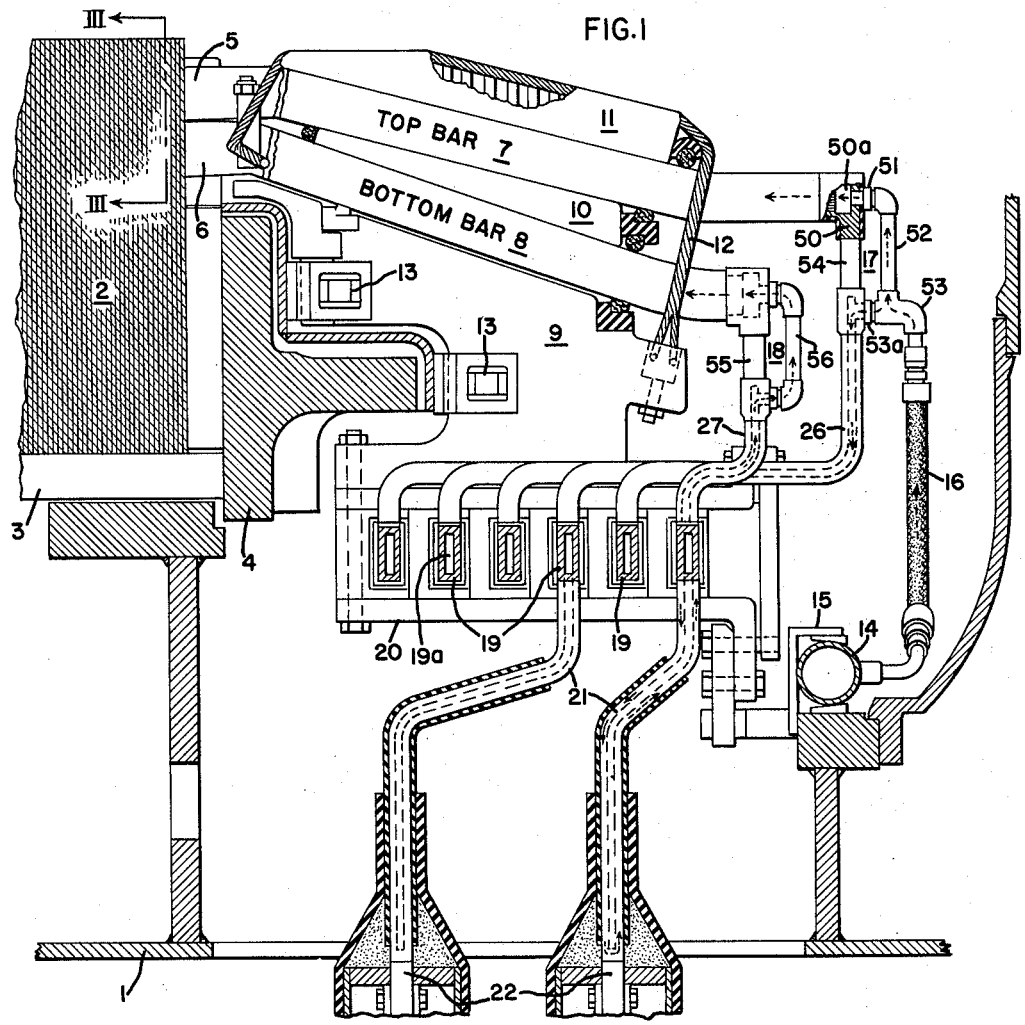
FIG. 1 is a horizontal elevation, partly in section, of the lower portion of a generator stator in the end turn region, taken at the location of the phase leads.

Referring briefly to the construction of the generator itself, and outer gas-tight wrapper 1 contains a supply of hydrogen gas used to cool the rotor (not shown) and portions of the stator core 2. Stator core 2 comprises laminations 2a held in place by an inner cage 3 and circumferential end flanges 4. The "top" (or radially inner) armature bars 5 and the "bottom" (or radially outer) armature bars 6 extend from slots in core 2 into the end turn region. Top bars 5 and bottom bars 6 are bent circumferentially in opposite directions as they emerge from the slot and are formed with a complex curvature to lie along a frusto conical surface. At most locations, they are simply connected together at a series loop to form a complete turn (see FIG. 5). However, at circumferentially spaced locations around the stator periphery, they terminate as extending phase leads where they are connected to the connection rings. In FIG. 1, the ends of a top phase lead bar 7 and a bottom phase lead bar 8 are shown, although it is understood that these bars have been rotated from their actual positions into the plane of the drawing so as to show their continuity from the slots.

The end turns of the winding are supported in a cage structure comprising circumferentially spaced, axially extending outer support members 9, intermediate spacer members 10, and inner support members 11. Inner members 11 and outer members 9 hold the end turn bars between them by means of a tension strap, such as a resin-impregnated glass fiber rope 12. Outer members 9 are mounted so as to be axially slidable with respect to the end flange 4 by means of slidable fittings 13. Additional details of the end turn support system may be had by reference to U.S. Patent 3,089,048 issued May 7, 1963 to J. J. Bahn, A. D. Coggeshall, R. T. Maher, and J. B. Waldbillig, and assigned to the assignee of the present application.

Liquid coolant is supplied from a source of liquid coolant under pressure (not shown) to an inlet header 14, which is a hollow circular pipe supported by suitable means such as the bracket 15. A similar outlet header at the other end of the machine (FIG. 6) collects the spent coolant, after which the coolant is cooled and recirculated and, after suitable processing, depending upon the type of coolant, is pumped back to inlet header 14 in a continuous cooling circuit. The liquid coolant is supplied to the armature conductor bars through a number of circumferentially spaced insulating hoses, such as the one shown at 16, either to the series loops (FIG. 5) or to phase lead inlet fittings, such as the group indicated generally at 17. Hoses 16 are preferably a multilayer structure of flexible insulating material reinforced to prevent collapse. They serve to insulate the windings from ground, while supplying liquid thereto.

As will be further explained in detail, a liquid is also furnished to the bottom phase leads 8 by means of a group of fittings indicated generally as 18. A portion of the liquid also flows through the leads 26, 27 which connect top and bottom phase leads 7, 8 respectively to the arcuate connection rings seen at 19. Connection rings 19 have internal cooling passage 19a and are held in suitable brackets 20 attached to the outer supporting members 9 so as to be axially slidable with the end turn supporting cage. Lower leads, two of which are shown at 21, are electrically and hydraulically connected to two corresponding connection rings 19. The lower leads 21 extend downward to connect with the main leads 22 leading to the bushings (not shown).

Reference to FIG. 2 of the drawing, illustrating an end view of the liquid fittings and portions of the end turns, will clarify the manner in which the phase leads bar 7, 8 are electrically and hydraulically interconnected with the connection rings and the lower leads. The drawing shows only one such connection ring and lower lead, in order to clarify the description, but it will be understood that a similar arrangement is used for each of the other connection rings and lower leads. It is also understood that phase lead bars connected by a connection ring will be of the same electrical phase. Also, since the top and bottom bars which are connected by one connection ring are circumferentially spaced approximately 120 electrical degrees, the drawing is broken away in segments to indicate this. Most of the end turns themselves and the end turn supporting structure are omitted for clarity.

As indicated in FIG. 2, each of the insulating hoses 16 supplies cooling liquid for a complete coil consisting of top and bottom bars. Most coils are supplied through series loop fittings indicated generally as 24. At several circumferentially-spaced locations, however, a group of special phase lead fittings shown generally at 25, are employed. The phase lead fitting group 25 consists of the two fitting groups 17 and 18 (see FIG. 1). At these locaitons, hoses 16 supply liquid to fittings 17. Each fitting 17 divides the liquid into two portions. One portion flows through top phase lead bar 7, while the other portion flows through a lead 26 electrically connected to bar 7. The other end of lead 26 is electrically and hydraulically connected to the connection ring 19 which extends through an arc to join another similar lead 27. The top of lead 27 is both electrically and hydraulically connected by means of fitting 18 (see FIG. 1) to the circumferentially spaced bottom phase lead bar 8.

At some intermediate point on connection ring 19, the top of a lower lead 21 is electrically and hydraulically connected, with its lower end being connected to leads 22 and then to the high-voltage bushings.

Figure 4:
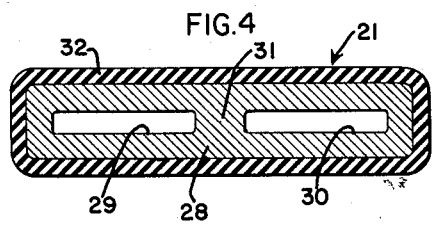
FIG. 4 is an enlarged cross-section through a lower lead taken along lines IV—IV of FIG. 2.

As indicated by the arrows in FIG. 2, the lower lead 21 is cooled by liquid flowing down toward the bushing and back again through two spaced passages. Reference to FIG. 4 of the drawing, which is a cross section taken through lead 21, indicates that it comprises a rectangular conductor bar 28 having two cooling passages 29, 30 spaced by a dividing web 31 and surrounded by insulation 32. A portion of the web 31 separating channels 29, 30 is cut away near the bottom to provide for a return flow of the liquid, as indicated in FIG. 2. At the top of lead 21, the liquid flow passages 29, 30 join the interior passage 19a in connection ring 19, while an obstruction 19b interrupts passage 19a. It will be apparent from tracing the arrows in FIG. 2 that liquid flows through lead 26, through a portion of connection ring 19, through lower lead 21, through the remainder of the connection ring 19, and thence through the lead 27.

Reference to FIG. 3 of the drawing indicates the manner in which liquid is conducted along the armature bars to cool the windings. The stator 2 includes a number of circumferentially spaced, axially extending slots 2a having conventional wedges 2b to hold the windings in place. The top bar 5 and the bottom bar 6 are constructed alike. Each comprises a number of transposed lightly insulated strands 35, some or all of which may be hollow, as indicated at 35a. The strands are stacked on top of one another and surrounded by heavy ground insulation 36, which may comprise a multilayer resin-impregnated micaceous material. Thus, the liquid flows through the hollow passages 35a to cool strands 35 very efficiently. However, as stated previously, the top bar 5 undergoes much greater ohmic losses due to its radially inner position in the slot. If equal rates of flow or if equal temperatures of coolant were supplied to top and bottom bars 5, 6, the average temperature of the top bar 5 would be greater than that of bottom bar 6, and the relative difference in length caused by thermal expansion could cause abrasion between bars 5 and 6.

In accordance with one aspect of the invention, the top and bottom phase lead bars 7, 8 are supplied with liquid at different temperatures, as will be seen from FIGS. 1 and 2, in order to reduce temperature difference between top and bottom bars. Looking first at the fitting 17 for top bar 7, it will be seen that the hollow strands pass through an aperture in the walls of a conductive box 50, and are electrically connected thereto with a leak-tight connection such as by brazing. The interior 50a of box 50 communicates with a pipe fitting 51 and a connecting pipe 52. Pipe 52 is connecetd to a T fitting 53 supplied by one of the insulated hoses 16. Liquid from the other outlet of T fitting 53, instead of passing directly to a bottom bar, is hydraulically joined to the lead 26 by means of a pipe fitting 53a. Although the top bar 7 and the lead 26 are supplied in parallel with liquid from the T fitting 53, they are directly connected electrically by means of copper straps 54 brazed therebetween.

The bottom bar 8 is supplied with liquid by means of a similar fitting 18. Lead 27 is electricaly connected to the box of fitting 18 by means of copper straps 55, as before, while the liquid bypasses straps 55 through a pipe 56 to enter the box by means of a piped connection 56, as will be apparent from the drawing.

It will be apparent then from FIGS. 1 and 2 taken together that low-temperature coolant entering fitting group 17 branches into two portions in the T fitting 53, one portion of the cold liquid going directly into the hollow strands of the phase lead top bar 7 and flowing to the other end of the generator. The other portion of coolant flows through lead 26 through a part of connection ring 19, down and back through the lower lead 21, along the remainder of connection ring 19, thence through lead 27, and through pipe 56 into the phase lead bottom bar 8. The liquid has increased in temperature in passing through the connection rings and lower lead. By proper sizing of the passages in these conductors, which may be determined either by calculation or by experimentation, the liquid entering bottom bars 8 is at a higher temperature than that entering top bars 7 by such an amount as to tend to equalize the temperatures between top bars 7 and bottom bars 8.

Construction of a typical "series loop" fitting 24 may be seen by reference to FIG. 5 of the drawing. There it may be seen that a top bar 5 and a bottom bar 6 terminate in hollow conductive boxes 37, 38 respectively. Strands 35, the exposed ends of which may be seen inside the boxes at 39, pass through apertures in the walls of boxes 38, 39, and are electrically connected thereto with a leak-tight joint, as by brazing. Top bar 5 is electricaly connected to bottom bar 6 by means of conducting straps 40 brazed between boxes 37, 38. Coolant liquid is supplied through pipe fittings 41 communicating with the hollow interiors 37a, 38a of boxes 37, 38 respectively, and from there to the cooling passages 35a which are open at the terminating ends 39 of the strands. The pipe fittings 41 supplying top and bottom bars are supplied in parallel with liquid from one of the insulating hoses 16 by means of a connecting pipe 42 and a modified T pipe fitting 43. One portion of the liquid is supplied to the top bar 5 through pipe 44, while the other portion is supplied to bottom bar 6 through pipe 45.

In accordance with another aspect of the invention, the pipe 44 is of much greater diameter than the pipe 45 as indicated by the cross sections. The larger pipe 44 thus supplies top bar 5 at a greater rate of flow than that at which restricted pipe 45 supplies bottom bar 6. The relative diameters of pipes 44, 45 are selected with regard to the various design factors, such as supply pressure, type of liquid, heat capacity of liquid, etc., so that the greater rate of flow through top bar 5 will be such as to accommodate the greater ohmic losses experienced in the top bar, and to tend to equalize the temperature between top and bottom bars. Although the relative sizes of pipes 44, 45 can be calculated, it may be desirable to establish these by experimentation while measuring the temperatures of the top and bottom bars. It will be seen that the greater rate of flow of coolant supplied to the top bars 5 causes this portion of the coolant to have a greater capacity for heat removal than the portion of coolant supplied to bottom bar 6.

A better understanding of the complete cooling arrangement for the liquid-cooled generator may be had by reference to the schematic drawing of FIG. 6, wherein the inlet header 14 is disposed on one end of the machine and an outlet header 60 is disposed at the opposite end of the machine. The solid lines 61 indicate the slot-lying portions of the top bars, while the dotted lines 62 indicate the slot-lying portions of the bottom bars. The connected portions 63 of the top and bottom bars indicate the connected end turns, and the junctions 64 represent the series loop fittings. The remaining single lines indicate liquid cooling paths, while the double-lined, short sections are insulating hoses. The electrical connections are omitted for clarity.

By following the lines related to cooling the phase lead bars, it will be observed that liquid entering from inlet header 14 passes through an insulating conduit 65, and then divides into two portions. One portion takes a path leading through a top bar 61 and leaves the winding through an insulating conduit 66, flowing to outlet header 60 at the other end of the machine. The other portion of the liquid from insulating conduit 65 passes along an arcuate conduit 67, corresponding to a portion of connection ring 19 shown in FIG. 2, and through a U-type conduit 68, corresponding to the passages in lower lead 21. From there, it flows through an arcuate conduit 69 representing the other portion of connection ring 19, and thence along a bottom bar 62 to exit through an insulating conduit 70 and outlet header 60.

The cooling arrangement for the remaining bars can be seen by tracing an insulating conduit 71 which branches at a series loop junction 72 to supply divided portions of liquid along top and bottom bars 61, 62 and to rejoin at series loop junction 73. From there the liquid leaves through insulating conduit 74 leading to outlet header 60. The series loop connection 72 provides restricted inlet flow to the bottom bar, as explained previously in connection with the FIG. 5 fitting. However, it would still be within the scope of the invention to restrict the outlet flow from the bottom bars by using such a fitting at 73 in FIG. 6.

The operation of the invention will be apparent from the following description. In either the series loop fittings or in the phase lead fittings, cold liquid coolant is supplied directly to the top bars to afford the greatest cooling possible. However, the heat removal capacity of liquid furnished to the bottom bars is reduced in the following ways. With respect to the terminating phase lead bars, the liquid is not supplied directly to the bottom bars, but is caused to flow through a path so as to cool the connection rings and the lower leads before flowing to a bottom bar circumferentially spaced from the top bar but which is electrically connected thereto. While cooling these leads, the temperature of the coolant is raised so that its heat-removing ability is commensurate with the smaller heat losses of the bottom bars. By suitably sizing the flow passages, the temperature difference between top and bottom bars can be reduced.

With respect to the series loop connections, the liquid divides to enter top and bottom bars. However, the rate of flow through the bottom bars is restricted by use of a smaller flow passage, so that the lesser rate of flow is commensurate with the smaller heat losses of the bottom bar. By proper sizing of the relative flow areas of pipes supplying top and bottom bars, the temperature difference therebetween can be greatly reduced. Although it is understood that the losses generated in top and bottom bars may be different at different load levels, the sizing of conduits is carried out to provide optimum temperature distribution at a selected load level. Thus the invention permits equalizing the temperatures of the respective pairs of top and bottom bars so as to reduce relative differential thermal expansion and thus lengthen the life of the bar insulation.

While there has been described what is considered to be the preferred embodiment of the invention, other modifications and advantages will become apparent to those skilled in the art, and it is desired to cover in the appended claims all such modifications as fall within the true spirit and scope of the invention.

What we claim as new and desire to secure by Letters Patent of the United States is:

1. In a liquid-cooled dynamoelectric machine, the combination of:
    a stator core having longitudinal circumferentially spaced slots,
    first and second conductor bars disposed in spaced slots and extending the length of the stator core and including internal liquid cooling passages, said first and second bars having terminating ends at circumferentially spaced locations on one end of the stator core, said first bar being subjected to greater ohmic losses during operation than said second bar, whereby relatively more heat is evolved in said first bar,
    a circumferentially extending connection ring electrically connecting the ends of the first and second bars, said connection ring also having internal liquid cooling passages,
    insulating hose means supplying liquid coolant under pressure,
    first conduit means receiving a first portion of the liquid from said insulating hose means and supplying it to the liquid cooling passages in the first bar, second conduit means receiving a second portion of the liquid from the insulating hose means and supplying it to the cooling passages in the connection ring, and third conduit means receiving said second portion of liquid from the connection ring passages and supplying it to the cooling passages in said second bar, whereby the liquid supplying the first bar is cooler than the liquid supplying the second bar, so as to reduce the temperature difference therebetween.

2. The combination according to claim 1, including a lower lead electrically connected to said connection ring, said lower lead defining cooling passages for the flow of liquid in both directions along its length, said lower lead cooling passages being connected in series with said connection ring cooling passages, whereby said second portion of liquid flows through the connection ring passages and the lower lead passages en route to the second bar.

3. In a liquid-cooled dynamoelectric machine, the combination of:

a stator core defining circumferentially spaced, axially-extending slots, a plurality of bottom conductor bars disposed in the radially outer portions of said slots, a plurality of top conductor bars disposed in the radially inner portions of the slots and subjected to greater losses in operation than said bottom bars whereby more heat is evolved in the top bars, said top and bottom conductor bars both including internal cooling passages, a plurality of circumferentially spaced, series loop conductors electrically connecting the ends of selected top and bottom bars to provide a plurality of phase windings, first and second top and bottom bars respectively of the same phase, having terminating end portions disposed at circumferentially spaced locations on the stator core, a circumferentially extending connection ring electrically connecting the ends of the first and second bars, said connection ring also having liquid cooling passages, a plurality of circumferentially spaced insulating hose means connected to a source of liquid coolant under pressure, first conduit means receiving a first portion of the liquid from one of said insulating hose means and supplying it to the cooling passages in the first bar, second conduit means receiving a second portion of the liquid from the same insulating hose means and supplying it to the cooling passages in the connection ring, and third conduit means receiving said second portion of liquid from the connection ring passages and supplying it to the cooling passages in the second bar, whereby the liquid supplying the first bar is cooler than the liquid supplying the second bar, so as to reduce the temperature difference therebetween.

4. The combination according to claim 3 including a lower lead electrically connected to said connection ring, said lower lead defining cooling passages for the flow of liquid in both directions along its length, said lower lead cooling passages being connected in series with said connection ring passages, whereby said second portion of liquid flows through the connection ring and the lower lead en route to the second bar.

5. The combination according to claim 3 including a plurality of hydraulic fittings supplying the cooling passages in top and bottom bars connected by said series loop conductors, fourth and fifth conduit means supplied in parallel flow by said insulating hose means, said fourth and fifth conduit means being connected to said hydraulic fittings supplying the cooling passages in the top and bottom bars respectively, said fifth conduit means including flow restricting means for reducing the flow of liquid to the bottom bar, whereby the temperature difference between top and bottom bars is reduced.

6. In a liquid-cooled generator, the combination of:

a stator core defining circumferentially spaced, axially-extending slots, a plurality of bottom conductor bars disposed in the radially outer portions of said slots, a plurality of top conductor bars disposed in the radially inner portions of said slots, and subjected to relatively greater ohmic losses during operation of the generator whereby more heat is evolved therein, said top and bottom conductor bars each comprising a plurality of transposed strands forming cooling passages for the flow of liquid coolant therethrough, a plurality of series loop conductors connecting selected top and bottom bars at both ends of said stator core to provide first and second windings of the same phase, first and second top and bottom conductor bars respectively from the first and second windings respectively having end portions terminating at circumferentially spaced locations on one end of the stator core, a circumferentially extending connection ring portion electrically connecting the ends of the first and second bars, said connection ring also having cooling passages, a lower lead electrically connected to the connection ring intermediate the first and second bars, said lower lead defining cooling passages connected in series flow relationship with the cooling passages of the connection ring portion, a first circumferential inlet header containing liquid coolant under pressure and disposed on the same end of the stator core as said connection ring portion, a second circumferential outlet header for receiving spent coolant and disposed on the other end of the stator core, a plurality of circumferentially spaced inlet and outlet insulating hose means connected to said inlet and outlet headers respectively, first and second conduit means supplied in parallel flow by selected inlet insulating hose means and supplying first and second liquid portions to the first bar cooling passages and the connection ring cooling passages respectively, third conduit means receiving said second liquid portion from the connection ring passages and supplying said second bar cooling passages, whereby the liquid entering the first bar is cooler than the liquid supplying the second bar to reduce the temperature differential therebetween, fourth and fifth conduit means supplied in parallel flow by selected inlet insulating hose means and furnishing liquid to the top and bottom bar cooling passages respectively at said series loop connections, and sixth and seventh conduit means receiving liquid from said top and bottom bars respectively at the other end of the stator core and connected to said outlet insulating hose means, whereby liquid cools the stator winding in a single pass along the stator core while the respective connection ring portions and lower leads are cooled by liquid before it enters said respective second bars.

7. The combination according to claim 6 including means restricting the flow of the portions of liquid which pass through the fifth conduit means, the bottom bars, and the seventh conduit means, whereby the liquid supplying all of the bottom bars in said stator core has less capacity for heat removal than that supplying said top bars to reduce the temperature differential between top and bottom bars.

References Cited in the file of this patent

UNITED STATES PATENTS 2,695,368     Kilbourne _____ Nov. 23, 1954